United States Patent [19]
D'Onofrio

[11] Patent Number: 5,924,518
[45] Date of Patent: Jul. 20, 1999

[54] LINEAR DRIVE ELECTRIC ASSIST STEERING SYSTEM

[75] Inventor: David J. D'Onofrio, Dearborn, Mich.

[73] Assignee: TRW Inc., Lyndhurst, Ohio

[21] Appl. No.: 08/686,089

[22] Filed: Jul. 24, 1996

[51] Int. Cl.$^6$ ..................................... B62D 5/04
[52] U.S. Cl. ............................ 180/444; 180/443; 310/12
[58] Field of Search ................... 180/443, 444, 180/446, 428; 310/12, 13, 14

[56] References Cited

U.S. PATENT DOCUMENTS

| | | | |
|---|---|---|---|
| 4,653,602 | 3/1987 | Anders et al. | 180/444 |
| 4,785,901 | 11/1988 | Maeda | 180/443 |
| 5,040,631 | 8/1991 | Lang | 180/444 |
| 5,685,390 | 11/1997 | Chikuma | 180/444 |
| 5,729,067 | 3/1998 | Janutka | 310/12 |

FOREIGN PATENT DOCUMENTS 116986  9/1978  Japan .

*Primary Examiner*—Anne Marie Boehler
*Attorney, Agent, or Firm*—Tarolli, Sundheim, Covell, Tummino & Szabo

[57] ABSTRACT

An electric power assist steering system (10) includes a pinion gear (102) supported for rotation in a motor housing (30). The pinion gear (102) is operatively connected to a steering wheel (12) of the vehicle through a torsion bar (106). A linear electric assist motor (17) is located in the housing (30). The motor (17) includes a stator (122) fixed to the motor housing (30) and a slider (124) supported for linear movement relative to the housing. Rack teeth (180) are disposed on the slider (124) in meshing engagement with the pinion gear (102). The system (10) further includes a torque sensor (110) for providing a torque signal in response to the sensed applied steering torque. A controller (186) provides a control signal in response to the torque signal and actuates the motor (17) to effect linear movement of the slider (124). Steering linkage members (18, 19, 20, 21) connect the slider (124) of the motor (17) to steerable wheels (22, 24) of the vehicle.

4 Claims, 2 Drawing Sheets

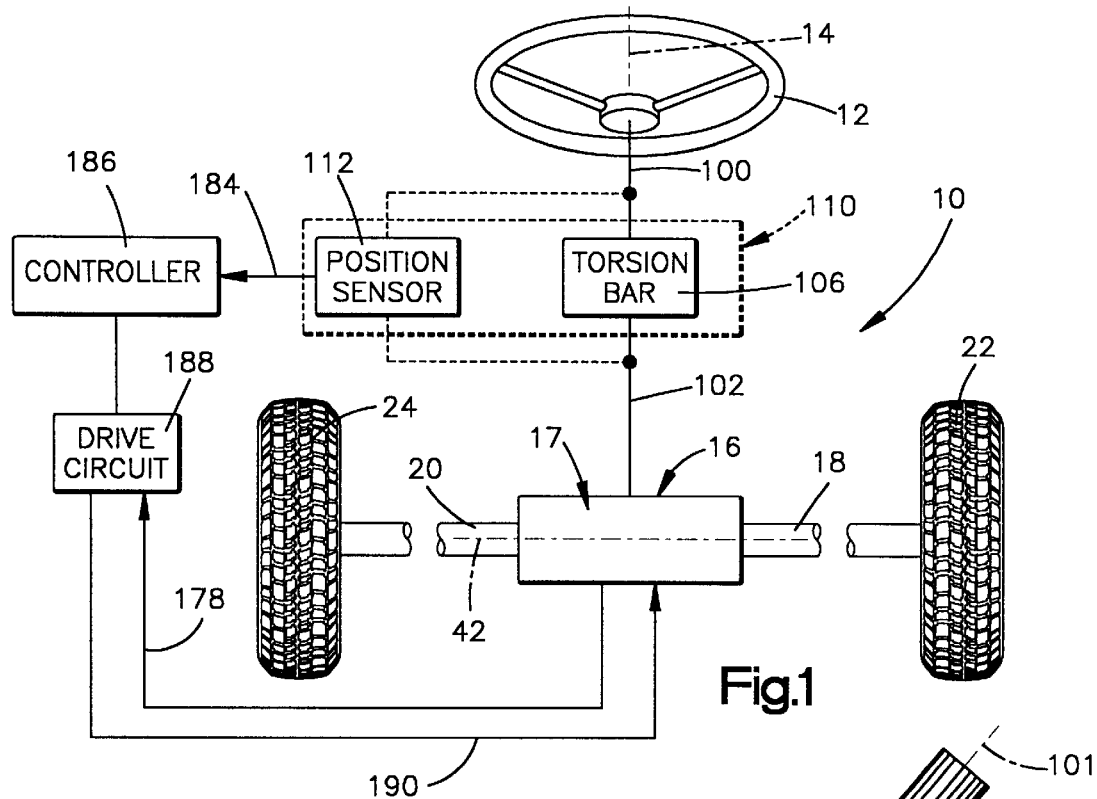
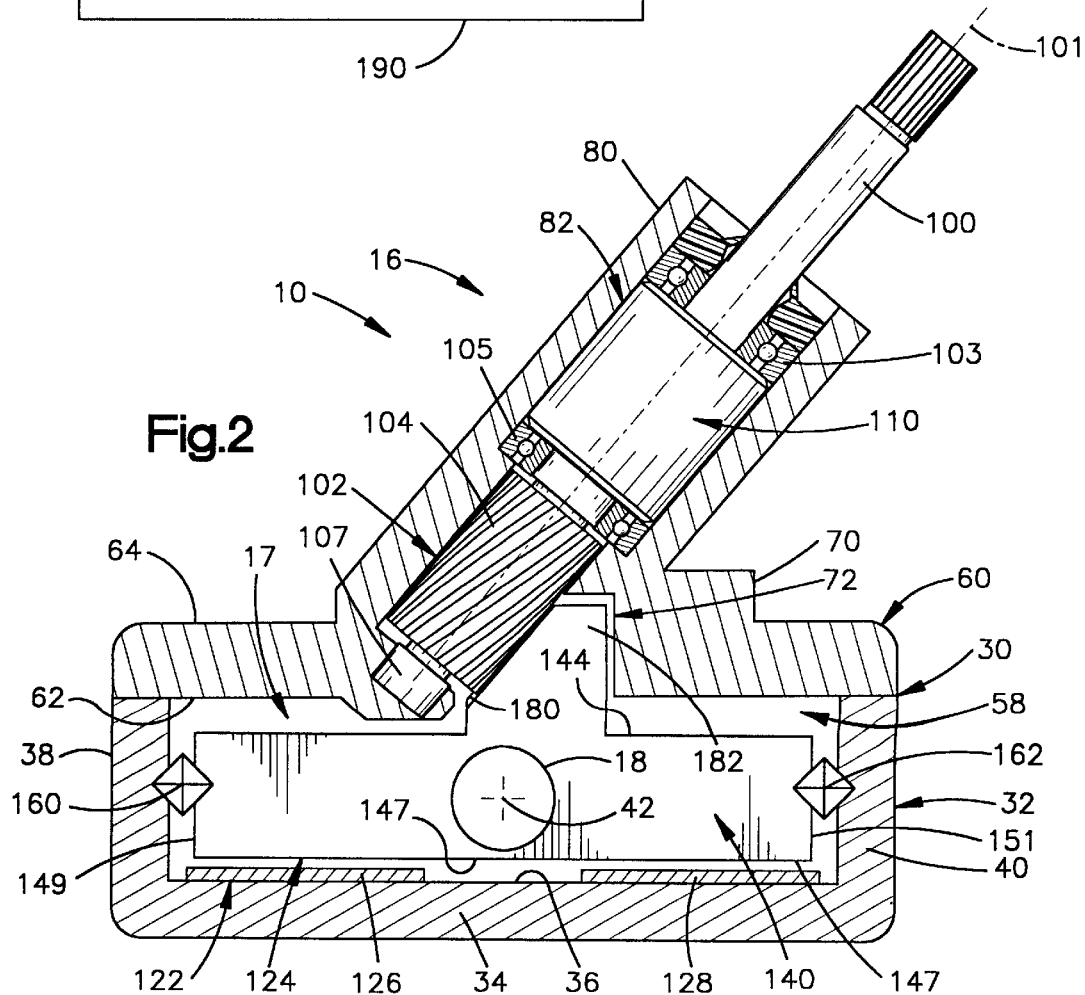

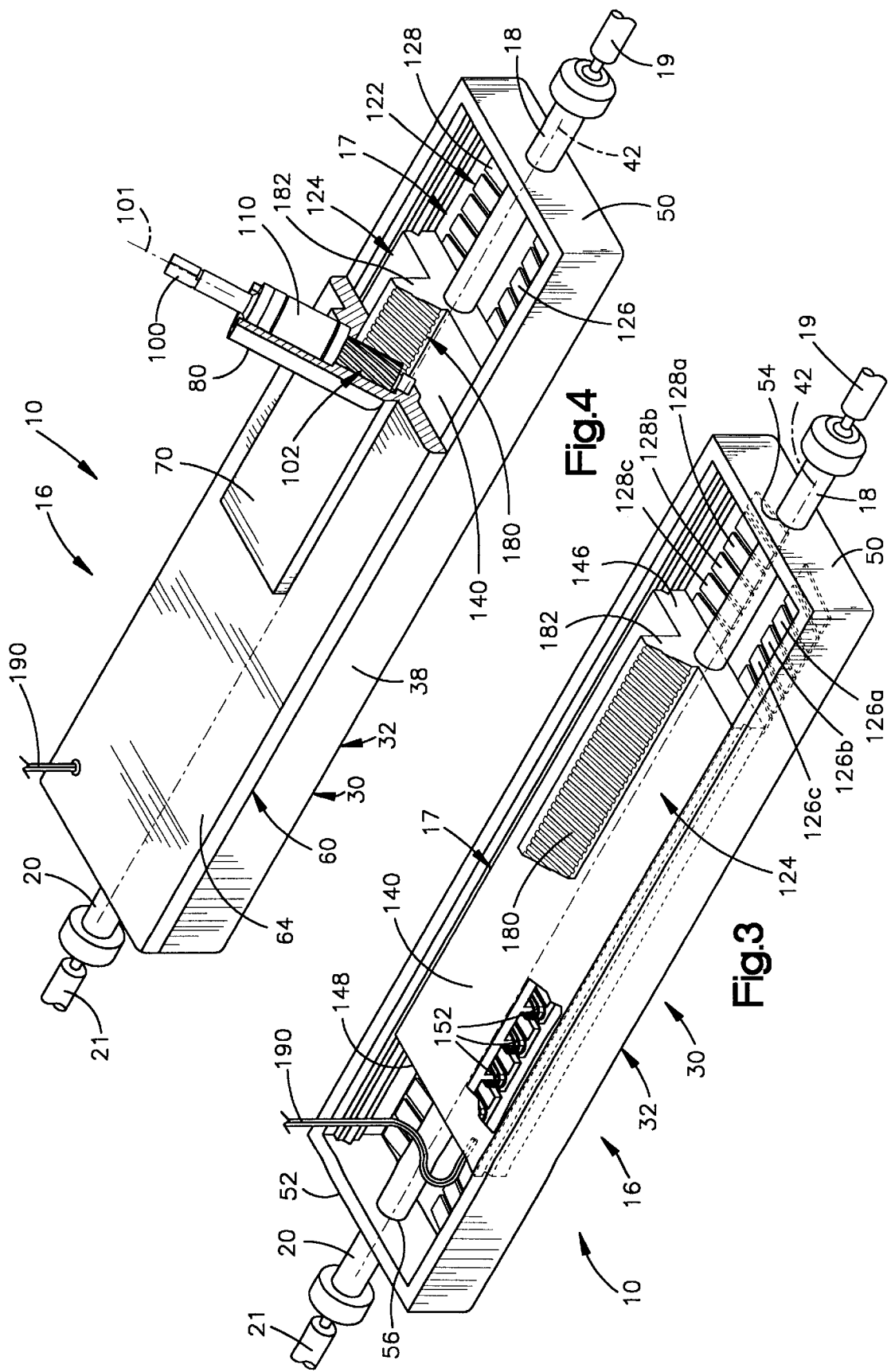

LINEAR DRIVE ELECTRIC ASSIST STEERING SYSTEM

BACK GROUND OF THE INVENTION

1. Technical Field

The present invention relates to a power assist steering system and is particularly directed to an electric assist steering system having a rack and pinion steering gear and a linear assist motor.

2. Description of the Prior Art

Power assist steering systems for providing steering assist to a rack and pinion gear set, in response to applied steering torque, are known. Some known systems provide hydraulic power steering assist; others provide electric power steering assist. Japanese Patent Application No. 116986-1978 discloses an electric power assist steering system having a linear electric motor operatively secured to a rack member. The linear electric assist motor and the rack and pinion gear set are two separate, spaced apart members.

SUMMARY OF THE INVENTION

In accordance with the present invention, a steering system provides steering assist in response to applied steering torque. The system comprises a pinion gear operatively connected to a steering wheel of the vehicle, means for sensing steering torque applied to the vehicle steering wheel, and means for providing a control signal in response to the sensed applied steering torque. The system includes a linear electric assist motor having a stator and having a slider supported for reciprocating linear movement relative to the stator. The slider of the linear electric motor includes rack teeth in meshing engagement with the pinion gear. The linear electric assist motor is actuated causing movement of the slider in response to the control signal. Steering linkage is connected with the slider of the linear electric assist motor for effecting steering movement of steerable wheels of the vehicle in response to linear movement of the slider.

In accordance with a preferred embodiment, the linear electric assist motor is disposed in a housing. The pinion gear is supported for rotation in the housing so as to be in meshing engagement with the rack teeth on the slider of the motor.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic illustration of an electric, power assist, rack and pinion steering system in accordance with the present invention;

FIG. 2 is a sectional view of a rack and pinion gear set and a linear electric assist motor of the steering system of FIG. 1;

FIG. 3 is a perspective view, partially cut away with parts removed for clarity, of the gear set and motor of FIG. 2; and FIG. 4 is a perspective view similar to FIG. 3, partially cut away, of the gear set and motor of FIG. 2.

DESCRIPTION OF A PREFERRED EMBODIMENT

The present invention relates to a steering system for providing steering assist in response to applied steering torque. In particular, the present invention relates to a steering system for providing electric power assist steering in response to applied steering torque.

Referring to FIG. 1, the steering system 10 includes a steering wheel 12 of a vehicle. The steering wheel 12 is supported for rotation about a steering axis 14. The system 10 also includes a drive assembly 16 having a linear electric assist motor 17. The drive assembly 16 is coupled by first and second drive members 18 and 20 to steerable wheels 22 and 24, respectively, in a known manner, through steering linkage members 19 and 21 (FIGS. 3 and 4) of the vehicle.

Referring to FIGS. 2–4, the linear electric assist motor 17 includes a motor housing 30. The motor housing 30 includes a base 32 having a rectangular, box-shaped configuration. The base 32 includes a bottom wall 34 having an inner side surface 36. First and second side walls 38 and 40 extend from the bottom wall 34 and extend parallel to a drive axis 42 of the system 10.

First and second parallel end walls 50 and 52 (FIG. 3) of the base 32 extend from the bottom wall 34 and between the side walls 38, 40. The first end wall 50 includes a drive member receiving bore 54 that receives the first drive member 18. The second end wall 52 includes a drive member receiving bore 56 that receives the second drive member 20. The bottom wall 34, the side walls 38 and 40, and the end walls 50 and 52 of the base 32 define a motor chamber 58 (FIG. 2) in the motor housing 30.

The motor housing 30 also includes a cover 60 (FIGS. 2 and 3) securable to the side walls 38, 40 and the end walls 50, 52 of the base 32. The cover 60 has a generally planar configuration including inner and outer surfaces 62 and 64, respectively. The inner surface 62 of the cover 60 faces the inner side surface 36 of the bottom wall 34 of the base 32.

A raised portion 70 of the cover 60 extends along a portion of the outer surface 64 of the cover. The raised portion 70 of the cover 60 includes a rack chamber 72 of the motor housing 30. The rack chamber 72 communicates with the motor chamber 58 in the motor housing 30. The cover 60 also includes a tower portion 80 having a pinion chamber 82. The pinion chamber 82 in the cover 60 communicates with the rack chamber 72 and, thereby, with the motor chamber 58.

An input shaft 100 is connected to the vehicle steering wheel 12 for rotation with the vehicle steering wheel 12. The input shaft 100 extends into the pinion chamber 82 of the tower portion 80 of the motor housing 30. The input shaft 100 is supported in the pinion chamber 82 by bearings 103 for rotation about an axis 101. The top of the tower portion 80 is sealed with an appropriate seal.

A pinion gear 102 is supported for rotation in the pinion chamber 82 of the housing 30 by bearings 105 and 107. The pinon gear 102 includes gear teeth 104. The input shaft 100 is operatively connected with the pinion gear 102, in a known manner, by a torsion bar 106. The torsion bar 106 twists in response to applied steering torque. When the torsion bar 106 twists, relative rotation occurs between the input shaft 100 and the pinion gear 102. Stops, not shown, limit the amount of such relative rotation between the input shaft 100 and the pinion gear 102 in a manner known in the art.

The torsion bar 106 forms a part of a torque sensor 110. The torque sensor 110 is disposed in the chamber 82 of the cover 60 of the housing 30. The torque sensor 110 also includes a position sensor 112 operatively coupled across the input shaft 100 and the pinion gear 102. The position sensor 112 outputs a signal indicative of the direction and magnitude of the applied steering torque. The position sensor 112 preferably includes a pair of optical encoders (not shown), one at either end of the torsion bar 106. The optical encoders sense the rotational position of the ends of the torsion bar 106 relative to a fixed reference point such as the vehicle chassis. A comparison of the readings from the two optical encoders provides the twist angle of the torsion bar 106, which angle is indicative of applied steering torque.

As mentioned, the drive assembly 16 of the steering system 10 includes a linear electric assist motor 17. A similar type of linear electric motor is manufactured by Anorad Corporation of Hauppauge, N.Y. and is designated by the Model Number LFB-S. Details of this motor are shown in a 1993 catalog of Anorad Corporation, a copy of which is submitted with this application and is incorporated herein by reference.

The linear electric assist motor 17, in accordance with the present invention, includes a stator or "primary" 122 which is fixed to the housing 30 and a slider 124 which is supported for reciprocating linear movement relative to the stator and the housing. The stator 122 of the linear electric assist motor 17 includes a series of permanent magnets 126 and 128 (FIGS. 2–4) which are secured to the inner side surface 34 of the bottom wall 36 of the base 32 of the motor housing 30. The permanent magnets 126 and 128 are preferably rare earth magnets.

Each one of the permanent magnets 126, 128 has a generally planar configuration including opposite, planar major side surfaces. In each magnet 126, 128, one of the major side surfaces overlies the inner side surface 36 of the bottom wall 34 of the base 32, and the other major side surface faces toward the slider 124 of the linear electric assist motor 17, that is, in an upward direction as viewed in FIG. 2. The north and south magnetic poles of each permanent magnet 126, 128 are on the opposite major side surfaces of the magnet. Thus, one magnetic pole of each magnet 126, 128 faces the inner side surface 36 of the bottom wall 34 of the base 32, and the other magnetic pole of each magnet 126, 128 faces the slider 124 of the linear electric assist motor 17.

The magnets 126 and 128 are aligned in two spaced apart linear arrays (FIGS. 3 and 4) which extend parallel to the drive axis 42. The magnets 126 and 128 are arranged in an alternating North-South polarity relationship. Thus, a first pair 126a and 128a (FIG. 3) of the magnets 126 and 128 may have a North polarity. That is, the magnets 126a, 128a are oriented so that their North magnetic poles face toward the slider 124. A second magnet pair 126b and 128b would have their South magnetic poles face toward the slider 124. The third pair 126c and 128c would have their North magnetic poles face toward the slider 124, etc.

The slider 124 of the linear electric assist motor 17 carries a plurality of coils that form a "secondary" of the motor. The slider 124 (FIGS. 2–4) includes a first portion 140. The first portion 140 has a rectangular box shaped configuration adapted to fit within the motor chamber 58. The first portion 140 has a top wall 144, end walls 146 and 148, a bottom wall 147, and side walls 149, 151.

The first portion 140 of the linear electric assist motor 17 is slidably mounted in the motor housing 30 with bearings 160, 162 disposed between the first portion and the side walls 38 and 40. The bearings 160 and 162 support the slider 124 of the linear electric assist motor 17 for reciprocating linear sliding movement, relative to the motor housing 30, in a direction parallel to the drive axis 42. The bearings 160 and 162 resist the strong magnetic attraction (directed vertically as viewed in FIG. 2) between the stator 122 and the secondary of the linear electric assist motor 17 so as to make the sliding movement of the secondary as effortless as possible. A preferred type of bearing 160 and 162 is a crossed roller bearing of the type obtainable from American Linear Manufacturers of Westbury N.Y. and designated by the Model Number RS236-36.

Disposed within the first portion 140 of the slider 124 of the linear electric assist motor 17 are a plurality of coils 152. The coils 152 are arranged so as to be selectively energizable. When energized, the coils create a magnetic field which moves the slider 124 relative to the stator 122 linearly along the length of the motor 17 in a direction parallel to the drive axis 42. The linear electric assist motor 17 also includes a position sensing mechanism (not shown), for example, Hall effect sensors, for determining the position of the slider 124 relative to the stator 122. This information is needed for commutation control of the coils 158 and is transmitted to the drive circuit 188 (or, alternatively, to the controller 186) over line 178 (FIG. 1). The operation and commutation control of an electric linear motor are well known in the art.

A series of rack teeth 180 are disposed on a rack extension portion 182 of the slider 124 of the linear electric assist motor 17. The rack extension portion 182 of the slider 124 projects from the first portion 140 of the slider. The rack extension portion 182 forms a second portion of the slider 124.

The second portion 182 of the slider 124 and the rack teeth 180 extend into the rack chamber 72 of the motor housing 30. The second portion 182 of the slider 124 and the rack teeth 180 are disposed between the first and second ends 146 and 148 of the first portion 140 of the slider 124. The pinion gear teeth 104 meshingly engage the rack teeth 180. Rotary motion of the steering wheel 12 results in linear motion of the rack extension portion 182 and, in turn, of the slider 124.

The drive members 18, 20 are secured to opposite ends of the slider 124 in a suitable manner, for example, through threaded connections. Linear movement of the slider 124 results in linear movement of the drive members 18, 20 which, in turn, results in steering movement of the steerable wheels 22, 24.

When steering torque is applied to the vehicle steering wheel 12, the input shaft 100 rotates about the axis 101. The direction and magnitude of the applied steering torque are sensed by the torque sensor 110. The torque sensor 110 outputs a torque signal 184 to a controller 186. The drive circuit 188, or alternatively, the controller 186, monitors the position of the slider 124 for commutation control. The controller 186 sends a control signal to a drive circuit 188 which, in turn, energizes the linear electric assist motor 17 through connection 190. The appropriate coils 152 in the slider 124 of the linear electric assist motor 17 are energized, so as to move the slider in the direction consistent with the applied steering torque and, thereby, provide steering assist in response to the applied steering torque.

From the above description of the invention, those skilled in the art will perceive improvements, changes and modifications in the invention. For example, the controller 186 has been described as operating in response to the torque signal from sensor 110. Such control could be thought of as being operative in response to a signal from position sensor 112. Also, use of non-positional torque sensors, such as eddy current torque sensors, is also contemplated. Also, the stator of the linear electric assist motor could include energizable coils and the slider could carry the permanent magnets. Such improvements, changes and modifications within the skill of the art are intended to be covered by the appended claims.

Having described the invention, the following is claimed:

1. A steering system for providing steering assist in response to applied steering torque, said system comprising:

a pinion gear operatively connected to a steering wheel of a vehicle;

means for sensing steering torque applied to the vehicle steering wheel and for providing a control signal in response to said sensed applied steering torque;

a linear electric assist motor having a stator and having a slider supported for reciprocating linear movement relative to said stator;

rack teeth on said slider of said linear electric assist motor and in meshing engagement with said pinion gear;

means for actuating said linear electric assist motor causing movement of said slider in response to said control signal; and steering linkage connected with said slider of said linear electric assist motor for effecting steering movement of steerable wheels of the vehicle in response to linear movement of said slider of said linear electric assist motor;

wherein said slider of said linear electric assist motor includes a plurality of coils, each one of said plurality of coils being selectively energizable, and wherein said stator includes a plurality of spaced apart magnets.

2. An automotive vehicle steering system for providing assist to the operator's steering input in response to an operator applied steering torque, said system comprising:

a motor housing;

a pinion gear supported for rotation in said motor housing, said pinion gear being operatively coupled to a manually operated steering wheel of a vehicle;

means for sensing torque applied to the steering wheel and for providing a control signal in response to said sensed applied steering torque;

a linear electric assist motor located in said motor housing, said linear electric assist motor having a stator fixed to said housing and having a slider supported for reciprocating linear movement relative to said stator;

rack teeth on said slider of said linear electric assist motor and in meshing engagement with said pinion gear;

means for actuating said linear electric assist motor causing movement of said slider in response to said control signal; and steering linkage connected with said slider for effecting steering movement of steerable wheels of the vehicle in response to linear movement of said slider;

wherein said stator of said linear electric assist motor includes a plurality of spaced apart permanent magnets arranged in a linear array.

3. A steering system for providing steering assist in response to applied steering torque, said system comprising:

a pinion gear operatively connected to a steering wheel of a vehicle;

means for sensing steering torque applied to the vehicle steering wheel and for providing a control signal in response to said sensed applied steering torque;

a non-rotary linear electric assist motor having a stator and having a slider supported for reciprocating linear movement relative to said stator;

rack teeth on said slider of said linear electric assist motor and in meshing engagement with said pinion gear;

means for actuating said linear electric assist motor causing movement of said slider in response to said control signal; and steering linkage connected with said slider of said linear electric assist motor for effecting steering movement of steerable wheels of the vehicle in response to linear movement of said slider of said linear electric assist motor;

wherein said slider of said linear electric assist motor includes a plurality of coils, each one of said plurality of coils being selectively energizable, and wherein said stator includes a plurality of spaced apart magnets.

4. An automotive vehicle steering system for providing assist to the operator's steering input in response to an operator applied steering torque, said system comprising:

a motor housing;

a pinion gear supported for rotation in said motor housing, said pinion gear being operatively coupled to a manually operated steering wheel of a vehicle;

means for sensing torque applied to the steering wheel and for providing a control signal in response to said sensed applied steering torque;

a non-rotary linear electric assist motor located in said motor housing, said linear electric assist motor having a stator fixed to said housing and having a slider supported for reciprocating linear movement relative to said stator;

rack teeth on said slider of said linear electric assist motor and in meshing engagement with said pinion gear;

means for actuating said linear electric assist motor causing movement of said slider in response to said control signal; and steering linkage connected with said slider for effecting steering movement of steerable wheels of the vehicle in response to linear movement of said slider;

wherein said stator of said linear electric assist motor includes a plurality of spaced apart permanent magnets arranged in a linear array.

* * * * *